March 12, 1940.  E. W. SMITH  2,193,781
ELECTRIC STORAGE BATTERY
Filed Jan. 18, 1937

WITNESS:
Robt R Mitchel.

INVENTOR
Edward W. Smith
BY
Augustus B. Stoughton
ATTORNEY.

Patented Mar. 12, 1940

2,193,781

UNITED STATES PATENT OFFICE 2,193,781

ELECTRIC STORAGE BATTERY

Edward W. Smith, Philadelphia, Pa., assignor to The Electric Storage Battery Company, Philadelphia, Pa., a corporation of New Jersey Application January 18, 1937, Serial No. 121,058

1 Claim. (Cl. 136—31)

The principal object of the present invention is to provide an improved storage battery element assembly which can be readily manufactured and in which separators may be renewed without dismantling the assembly and which serves to securely hold the elements or plates in the form of a unit which can be transported and used in connection with such jars or containers as may be chosen in respect to both size and material.

Other objects of the invention will appear from the following description at the end of which the invention will be claimed.

Generally stated the invention consists of standard plates or elements, except that the outside plates or elements are reinforced by increasing the depth of their ribs and except that the outside plates or elements are provided with ears extending outward from their margins, and the ears are connected by tie bars arranged outside of the margins of the intermediate plates.

The invention also consists in the improvements to be presently described and finally claimed.

Referring to the drawing

Figure 1:
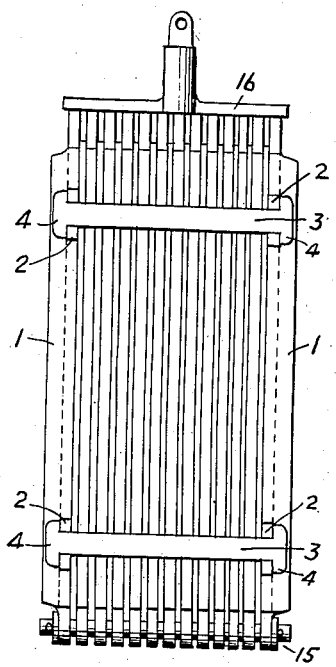
Figure 1 is an end elevational view of a storage battery element assembly embodying features of the invention.
Figure 2:
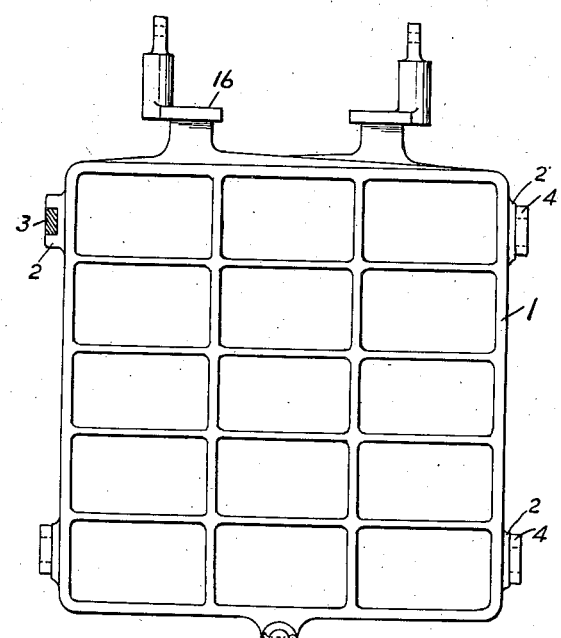
Fig. 2 is a side view of the same.

Referring to the drawing the outside plates or elements of the assembly are reinforced by comparatively deep integral ribs 1 which extend at their margins and over the exposed faces. The outside plates or elements thus comprise a marginal frame having ribs 1 integral therewith, main ribs also having ribs 1 integral therewith, and second ribs not having ribs 1 thereon and interposed between and spaced from the main ribs. These ribs sufficiently stiffen the outside plates and they do this without introducing complications in the manufacture of the plates. The outside plates are provided with ears 2, extending from the margin outward. The tie bars 3 are arranged outside of the margins of the intermediate plates and they have heads engaging the ears.

Figure 3:
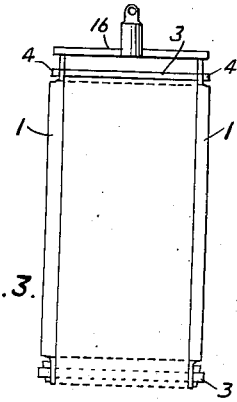
Figs. 3 and 4 are views similar to Figs. 1 and 2 but illustrating a modification.
Figure 4:
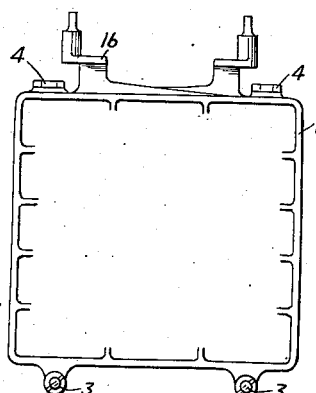
Figure 5:
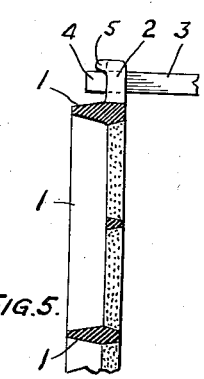
Fig. 5 is a transverse sectional view of one of the outside plates or elements of the assembly drawn to an enlarged scale and illustrating reinforcement of the ribs by increasing their depth.
Figure 8:
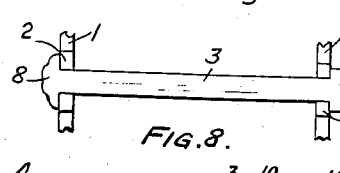
Fig. 8 is a view illustrating another modification in the method of securing the tie bar to the ears.
Figure 7:
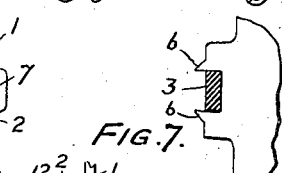
Fig. 7 is a view illustrating a modification.
Figure 6:
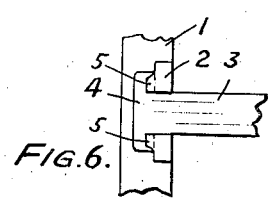
Fig. 6 is a top or plan view of Fig. 5 showing the connection of the tie bar to an ear extending beyond the margin of the plate.
Figures 9, 10, 11:
Fig. 9 is a view illustrating another modification.
Figs. 10 and 11 are transverse sectional views illustrating other modifications.

Referring to Figs. 5 and 6, the heads 4 of the tie bars engage the ears and the latter are provided with lips 5 which extend from ears 2 in the direction of the axis of tie bars 3 and which overlie the heads of the tie bars and so hold them down in the claws. As shown in Fig. 7 the lips 6 on the ears extend from ears 2 transversely of tie bars 3 and are to be bent down over the tie bars after the latter have been mounted in order to hold the tie bars in place. The tie bars shown are generally rectangular in cross section. As shown in Fig. 8 the tie bar is provided with one head 7 and the other head 8 is provided by welding or puddling after the assemblage has been made and while it is held under suitable pressure. In Fig. 9 the tie bar is shown as of metal and it is protected with a covering 10 of insulating material. In this figure, as in Fig. 8 the end 11 of the tie bar may be headed by swaging. It is necessary to cover only the top and inside face of the tie bar when made of metal and this can be done by a grooved shaped cover 12 as in Fig. 10 or a cover 13 of L section as shown in Fig. 11. The ears may be variously disposed so as to project from the margin at different points thereof. In Fig. 1 they project from the vertical margins of the plate, in Fig. 3 they project from the top and bottom of plate and obviously some of them may be omitted and reliance had upon the rods 15 which are ordinarily supplied to hold the separators in place or upon the straps 16 at the tops of the plates. In Figs. 3 and 4 the bottom tie bars 3 also serve to support the separators.

From the foregoing description it is evident that by unfastening one of the ends of the tie bar the assemblage may be opened for the removal or inspection of separators and reassembled. For this purpose it may be necessary to cut away some of the lips or to unfasten some of the welded joints but they can be readily reformed. Again the intermediate plates or elements of the assemblage are standard and so are the outside plates or elements with the exception of the deepening of the ribs and the provision of the ears extending out from the margin and these changes introduce no objectionable or substantial changes in manufacture. Also separators of standard design may be used.

A plate embodying features of the invention may be made in the following way. The active material is applied to the right-hand portion of the grid, Figure 5, of usual thickness in any preferred manner.

It will be obvious to those skilled in the art to which the invention relates that modifications may be made in details of construction and arrangement without departing from the spirit of the invention which is not limited in respect to such matters or otherwise than as the prior art and the appended claim may require.

I claim:

In a storage battery element assembly having outside plates of thickness of active material appropriate for the required capacity, the combination of facial reenforcement ribs of conducting material at the margins and over the exposed faces of the outside plates and integral therewith, said ribs extending beyond the surfaces of the active material, ears extending outward from the margins of the outside plates, and tie bars arranged outside of the margins of the intermediate plates and connected with the ears.

EDWARD W. SMITH.